J. S. GRAVES.
Vehicle-Spring.

No. 215,453.   Patented May 20, 1879.

Witnesses:
Donn J. Twitchell.
William W. Dodge.

Inventor:
J. S. Graves.
By his Attys.
Dodge & Son

UNITED STATES PATENT OFFICE.

JOSEPH S. GRAVES, OF IONIA, MICHIGAN.

IMPROVEMENT IN VEHICLE-SPRINGS.

Specification forming part of Letters Patent No. 215,453, dated May 20, 1879; application filed April 9, 1879.

*To all whom it may concern:*

Be it known that I, JOSEPH S. GRAVES, of Ionia, in the county of Ionia and State of Michigan, have invented certain Improvements in Carriage-Springs, of which the following is a specification.

The objects of my invention are to produce an elliptic spring which shall be cheaper and lighter than those now in use, less liable to fracture, noiseless in action, and free from liability to become worn and weakened by use; and to this end the invention consists in forming the spring of wire or small steel rods, bent into the required form, and provided at suitable points with eyes or coils to prevent breakage and give the required elasticity, and also in bearings arranged to come into action and sustain the spring when subjected to excessive strains.

Figure 1:
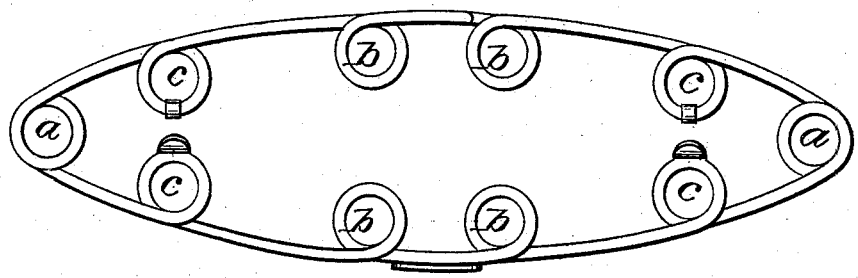
Figure 2:
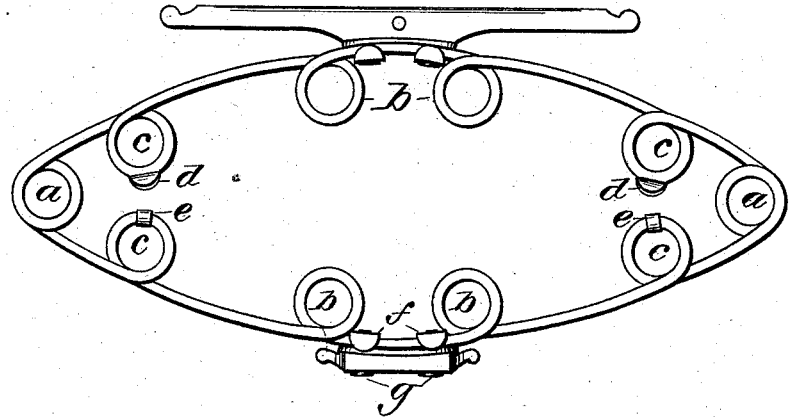
Figure 3:
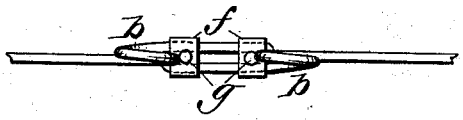

Figure 1 represents a side elevation of a spring made complete in one piece; Fig. 2, a similar view of a spring made in two pieces; Fig. 3, a view showing the manner in which the sections of the two-part spring are united.

In constructing my springs I take steel or other highly-elastic wire of large size, or small steel rods, of either round or angular form in cross-section, and bend them into an elliptic form, at the same time forming therein at the ends and at such other points as desired coils or eyes $a$ $b$, &c. Ordinarily each spring is made with eyes $a$ at the ends, eyes $b$ near the middle, and eyes $c$ near the ends, as shown, each spring having in such case ten eyes or coils. The coils admit of the spring being subjected to very heavy strains without danger of breakage, and give it far greater elasticity and ease of action than it would otherwise have.

When the springs are to be used under light loads only, the coils $c$ may be omitted; but when designed for heavy loads said coils are provided with bearing-pieces $d$ $e$, so arranged that when the spring is compressed to a great extent the coils $c$ of the upper half of the spring will seat themselves on and be sustained by the bearings or the corresponding coils on the lower part of the spring. In this way the spring receives a strong re-enforcement, and, without being made too stiff and heavy for ordinary use, is adapted to carry heavy loads with safety.

The entire spring may be made in one piece, with the ends joined and fastened together at the middle, as represented in Fig. 1; or it may be made in two equal parts, united at the middle of the spring at top and bottom, as shown in Fig. 2.

In the drawings, Figs. 2 and 3, the ends of the two parts are lapped past each other and clamped under two plates, $f$, which are secured by bolts or screws $g$, around which the ends of the spring are bent, as shown. Any other suitable arrangement may, however, be adopted for uniting the two parts.

Particular care is to be taken in the construction of the springs that the coils do not rub or wear upon themselves at the sides.

Springs constructed on my plan are light, highly elastic, much cheaper than the ordinary leaf-springs, noiseless in action, and free from wear.

Having described my invention, what I claim is—

1. The improved elliptic carriage-spring consisting of wire or rods bent into form and provided with the coils, substantially as described and shown.

2. The elliptic carriage-spring consisting of the elastic wire bent into form and provided with the coils at the ends and near the middle, as shown.

3. The elliptic spring formed as described, and having the coils or bearings $c$ to give it support when subjected to heavy strains, as shown and described.

4. The spring consisting of two wires or rods bent into shape, provided with coils, and united at the middle, substantially as shown and described.

JOSEPH S. GRAVES.

Witnesses:
C. O. THOMPSON,
EPHRAIM J. GRAVES.